United States Patent
Le Bars et al.

(10) Patent No.: US 10,970,066 B1
(45) Date of Patent: Apr. 6, 2021

(54) DUPLICATE CODE SECTION DETECTION FOR SOURCE CODE

(71) Applicant: International Business Machines Corporation, Armonk, NY (US)

(72) Inventors: Hervé Le Bars, Villemoisson sur orge (FR); Jerome Jochem, Montgeron (FR); Thomas Baudel, Paris (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/842,903

(22) Filed: Apr. 8, 2020

(51) Int. Cl.
*G06F 9/00* (2006.01)
*G06F 8/75* (2018.01)

(52) U.S. Cl.
CPC .................... *G06F 8/751* (2013.01)

(58) Field of Classification Search
CPC ....................................... G06F 8/751
See application file for complete search history.

(56) References Cited

U.S. PATENT DOCUMENTS

| | | |
|---|---|---|
| 864,533 A | 8/1907 | Hadley |
| 6,278,992 B1* | 8/2001 | Curtis ................. G06F 16/2237 707/711 |
| 9,110,769 B2 | 8/2015 | Zhang et al. |
| 2002/0133491 A1* | 9/2002 | Sim ...................... H04L 67/1023 |
| 2004/0133577 A1* | 7/2004 | Miloushev ............ H04W 4/027 |
| 2014/0136779 A1* | 5/2014 | Guha ...................... H04L 67/10 711/114 |

FOREIGN PATENT DOCUMENTS

| | | |
|---|---|---|
| CN | 106919433 A | 7/2017 |
| CN | 106990956 A | 7/2017 |

* cited by examiner

*Primary Examiner* — Jae U Jeon
(74) *Attorney, Agent, or Firm* — Cantor Colburn LLP; Noah Sharkan (57) ABSTRACT

Techniques for duplicate code section detection for source code are described herein. An aspect includes receiving a plurality of input files corresponding to a software project comprising source code written in a computer programming language. Another aspect includes segmenting each of the plurality of input files into a plurality of statements based on instruction boundaries corresponding to the computer programming language, wherein a respective statement start index is determined for each of the plurality of statements. Another aspect includes populating an enhanced generalized suffix array (eGSA) based on the determined statement start indices, wherein each statement start index corresponds to a respective suffix in a row in the eGSA, and wherein each row comprises a longest common prefix (LCP) field and a preceding statement value corresponding to the row's respective suffix. Another aspect includes identifying duplicate code sections in the plurality of input files based on the eGSA.

20 Claims, 4 Drawing Sheets

DUPLICATE CODE SECTION DETECTION FOR SOURCE CODE

BACKGROUND

The present invention generally relates to computer systems, and more specifically, to duplicate code section detection for source code in a computer system.

A software project may include a large number of files, each containing many lines of source code. When programming for a large software project, programmers may reuse, or duplicate, the same or similar logic at multiple locations or contexts within the software project. Duplicate code sections may create potential maintenance issues in the software project and may also create liability issues due to copyright ownership of the original code.

SUMMARY

Embodiments of the present invention are directed to duplicate code section detection for source code. A non-limiting example computer-implemented method includes receiving a plurality of input files corresponding to a software project, the plurality of input files comprising source code written in a computer programming language. The method also includes segmenting each of the plurality of input files into a plurality of statements based on instruction boundaries corresponding to the computer programming language, wherein a respective statement start index is determined for each of the plurality of statements. The method also includes populating an enhanced generalized suffix array (eGSA) based on the determined statement start indices, wherein each statement start index corresponds to a respective suffix in a row in the eGSA, and wherein each row comprises a longest common prefix (LCP) field and a preceding statement value corresponding to the row's respective suffix. The method also includes identifying duplicate code sections in the plurality of input files based on the eGSA.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

One or more embodiments of the present invention provide duplicate code section detection for source code. Embodiments of duplicate code section detection may identify identical code fragments of maximal size in the files of a software project in a relatively efficient manner based on construction and traversal of an enhanced generalized suffix array (eGSA). Identification of duplicate code sections within a software project may enable assessment of the code quality of a large software project and may allow redundant code sections to be appropriately flagged, justified, or eliminated. Embodiments of duplicate code section detection may be applied to software projects written in any computer programming language. One or more embodiments of duplicate code section detection may be applied in the context of mainframe common business-oriented language (COBOL) programming, in which very large code bases (e.g., millions of lines of code) have evolved over the course of many years, resulting in relatively complex maintenance being required.

Identical sections of source code having a size above a threshold may be detected across all input program files corresponding to a software project using the eGSA that is constructed based on the input program files. The input program files may be segmented into statements based on instruction boundaries in the source code. The identification of the instruction boundaries may depend on the computer programming language of the source code. Embodiments of the eGSA are populated with entries (i.e. suffixes) corresponding to each instruction start index in the input files. The entries are sorted by the lexicographic order of the suffixes. The eGSA includes, for each statement that is identified in the input program files, a file identifier, a suffix index corresponding to the statement, a longest common prefix (LCP) value, and a preceding statement value including a numeric value (e.g., a hashcode or fingerprint) that is determined based on, and uniquely identifies, the statement preceding the current suffix.

Construction of the eGSA may include segmenting the input files to retain the starting and ending indices of the code statements of the source code. Because embodiments of the eGSA are limited to entries corresponding to statement start indices (e.g., whole instructions) from the input file, the overall size of the eGSA may be reduced. Use of the hash, or fingerprint, for the preceding statement value may also reduce the size of the eGSA, thereby reducing the processing and memory resources required for constructing and traversing the eGSA. In some embodiments, tokenization that can operate on strings (e.g., words or on statement chunks) may be applied to the segmentation. For example, the tokenization may replace a common words or sequence of words in the computer programming language corresponding to the input files with a shorter string or single character in the eGSA in some embodiment. Duplicate code sections may be identified based on traversing the entries in the eGSA to identify any entries having an LCP value that is above a threshold; the threshold may have any appropriate value. For each entry having an LCP above the threshold, it is determined whether the preceding statement value of the entry is identical to a preceding statement value of the previous entry in the eGSA. If the preceding statement values are not the same, it is determined that the candidate entry is the start of a maximal length duplicate code section. Any duplicate code sections identified by the traversal may be displayed to a user in any appropriate manner. In some embodiments, the determined duplicate code sections may be trimmed to fit the end of statements based on, e.g., instruction boundaries corresponding to the computer programming language of the source code.

Figure 1:
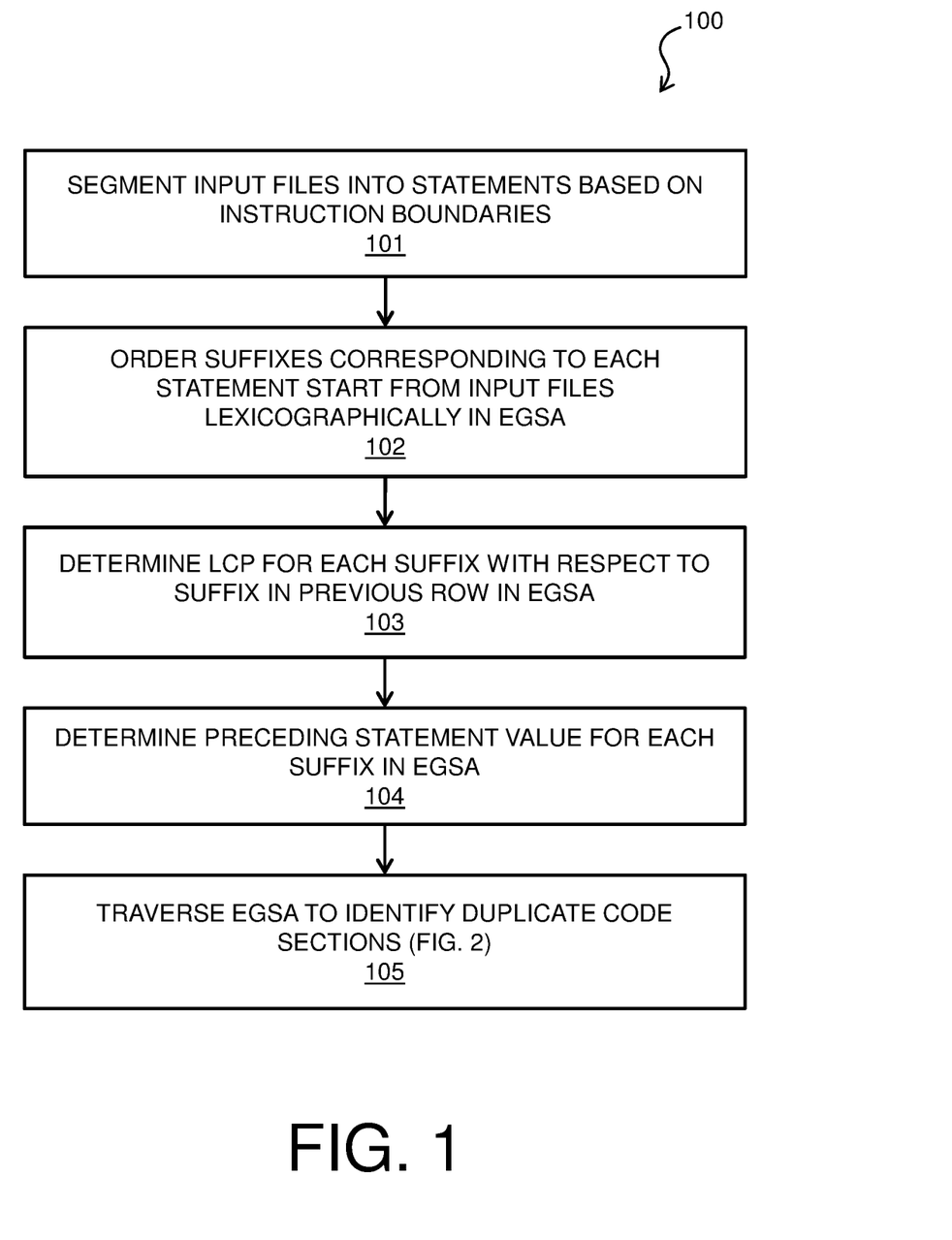
FIG. 1 is a flow diagram of a process for duplicate code section detection for source code in accordance with one or more embodiments of the present invention.

FIG. 1 shows a process flow diagram of a method 100 for duplicate code section detection for source code in accordance with one or more embodiments of the present invention. FIG. 1 may be implemented in conjunction with any appropriate computer system, such as computer system 400 of FIG. 4. In block 101 of method 100, input files comprising source code corresponding to a software project are received. Any appropriate number of input files may be received and processed in block 101, and the input files may be in any appropriate computer programming language(s). The received input files are segmented into statements in block 101 based on instruction boundaries (i.e., defined beginnings and ends of instructions). The instruction boundaries may correspond to the computer programming language(s) of the source code in the input files. For example, instruction boundaries may be denoted by particular characters, e.g. ";" or ".", or by a carriage return. The statements that are determined in block 101 may be full instructions.

In some embodiments, the input strings comprising the source code of the input files may be tokenized in block 101. For example, frequently used strings, such as keywords (e.g., ADD, MOVE, DIVIDE) or sequences of keywords, may be replaced by shorter strings or single characters in the segmented statements, in order to reduce the size of the processed source code text. The frequently used keywords or common sequences may be determined based on a dictionary corresponding to the computer programming language(s) of the input files in some embodiments. In some embodiments, any instruction chunk that lies between two consecutive instruction boundaries may be tokenized in block 101.

In block 102 of method 100, suffixes corresponding to the statement start indices that were determined in block 101 are ordered lexicographically in the rows of an eGSA. Each suffix is located in a respective row in the eGSA. The lexicographical ordering may be performed in any appropriate manner, e.g., alphabetically or reverse alphabetically, in various embodiments. In some embodiments, the suffixes corresponding to the statement start indices that were determined in block 101 may be placed in groups corresponding to their respective input files and may be ordered lexicographically within each group. The lexicographically ordered groups may then be merged to determine the overall eGSA corresponding to the software project. Each row may further include a file identifier (ID), indicating an input file where the statement is located. Each row in the eGSA further includes a respective LCP field and preceding statement value field.

In block 103, the LCP fields in the eGSA are populated. For each row in the eGSA, the LCP is determined for the current row suffix with respect to the suffix in the previous row, and gives a measure of sameness between the two suffixes. For example, an LCP may correspond to a number of characters that match in the input files of the current row suffix and the previous row suffix starting from the beginning of both suffixes. In some embodiments, the LCPs may be determined in linear time based on the merging phase that was performed in block 102.

In block 104, the preceding statement value fields in the eGSA are populated. For each row in the eGSA, a statement directly preceding the current row suffix in the input file of the current row suffix is identified in block 104. The preceding statement value corresponds to the identified preceding statement, and may include a hash or fingerprint of the string starting on the preceding statement start index and ending at the current row suffix index. The preceding statement value is placed in the preceding statement value field in the eGSA row.

In block 105, the constructed eGSA is traversed to determine any duplicate code sections in the set of input files. Block 105 is discussed in further detail below with respect to method 200 of FIG. 2. Duplicate code sections of maximal length may be identified in block 105, and the identified duplicate code sections may be displayed to a user in any appropriate manner. Knowledge of the identified duplicate code sections may be used to maintain the code base corresponding to the input files in some embodiments. For example, a change in a code section that has one or more duplicate code sections in the code base may be propagated to the duplicate code sections based on the identification of the duplicate code sections.

The process flow diagram of FIG. 1 is not intended to indicate that the operations of the method 100 are to be executed in any particular order, or that all of the operations of the method 100 are to be included in every case. Additionally, the method 100 can include any suitable number of additional operations.

Figure 2:
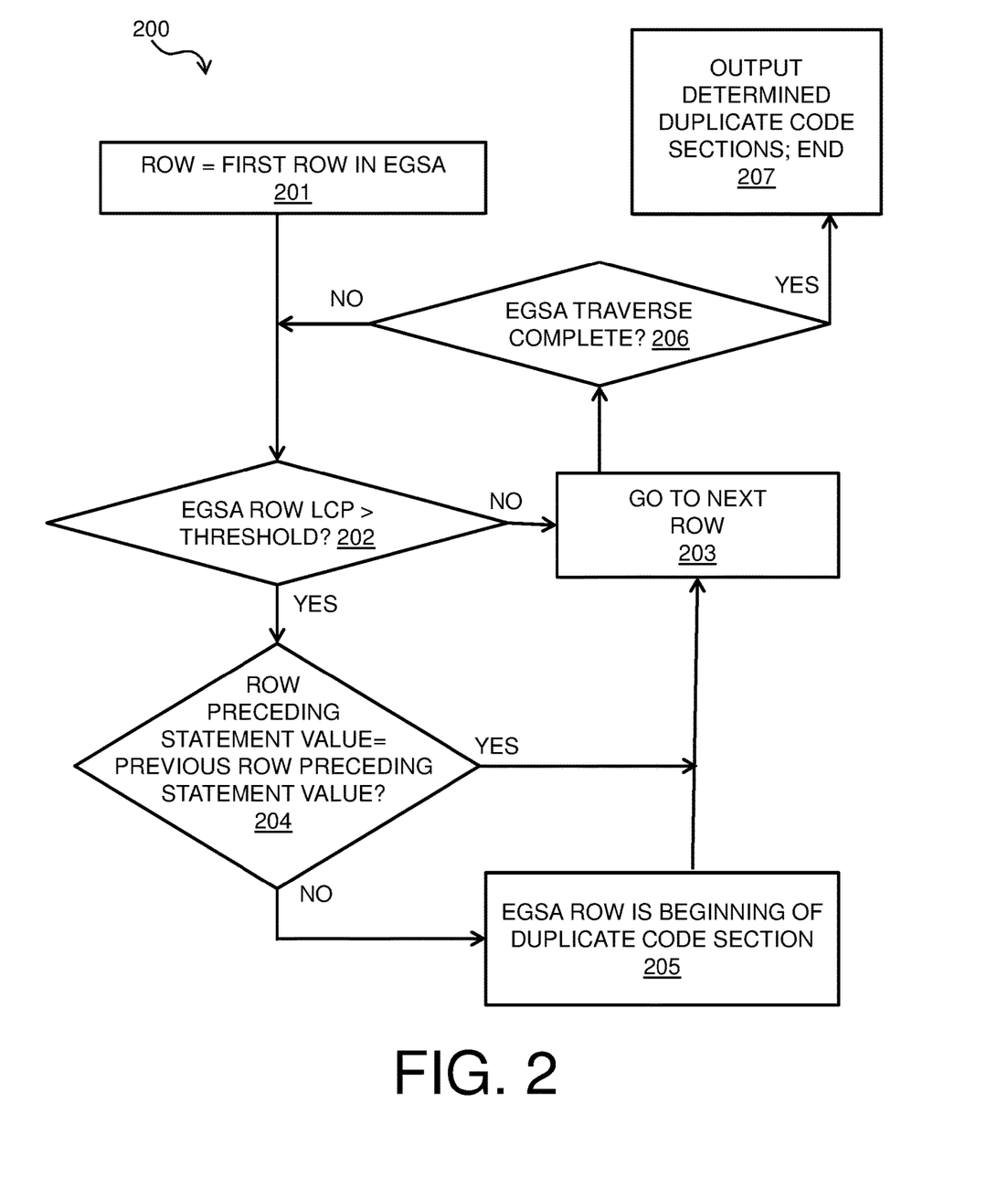
FIG. 2 is a flow diagram of a process for enhanced generalized suffix array (eGSA) traversal for duplicate code section detection for source code in accordance with one or more embodiments of the present invention.

FIG. 2 shows a process flow diagram of a method 200 for eGSA traversal for duplicate code section detection for source code in accordance with one or more embodiments of the present invention. Method 200 of FIG. 2 may be performed in block 105 of method 100 of FIG. 1 based on the eGSA that was constructed and populated in blocks 101-104 of method 100 of FIG. 1. In block 201, a current row is set equal to a first row in the eGSA. In block 202, it is determined whether the LCP field of the current row of the eGSA is greater than a threshold. The threshold may have any appropriate value in various embodiments. If it is determined in block 202 that the LCP field of the current row is not greater than the threshold, flow proceeds from block 202 to block 203, in which the current row is incremented, e.g., set equal to a next row in the eGSA. Flow proceeds from block 203 to block 206, in which it is determined whether the traversal of the eGSA is complete (e.g., the current row is outside of the eGSA). If it is determined that the traversal of the eGSA is not complete in block 206 (i.e., not all rows of the eGSA have been processed), flow proceeds from block 206 back to block 202, in which it is determined whether the LCP of the current row of the eGSA is greater than the threshold.

When it is determined in block 202 that the LCP field of the current row of the eGSA is greater than the threshold, flow proceeds from block 202 to block 204. In block 204, it is determined whether the preceding statement value field of the current row is the same as the preceding statement value field of the previous row in the eGSA. In various embodiments, the preceding statement values includes hashes, or fingerprints, of input strings corresponding to preceding statements from the input files of the statement of the current row. If it is determined in block 204 that the preceding statement value of the current row is the same as the preceding statement value of the previous row, it is determined that the current row statement is not the start of a maximal duplicate code section. Flow proceeds from block 204 to block 203, and a next row of the eGSA is processed.

If it is determined in block 204 that the preceding statement value of the current row is not the same as the preceding statement value of the previous row, it is determined that the current row statement is the start of a maximal duplicate code section, and flow proceeds from block 204 to block 205. In block 205, the suffix corresponding to the current row in the eGSA is added to a set of determined duplicate code sections. The LCP of the current row gives a size of the determined duplicate code section. Flow then proceeds from block 205 back to block 203, and a next row of the eGSA is processed. Each row in the eGSA is processed according to blocks 202, 203, 204, and 205 until it is determined in block 206 that the traversal of the eGSA is complete, i.e., the current row index is outside of the eGSA. When it is determined that the traversal of the eGSA is complete in block 206, flow proceeds from block 206 to block 207. In block 207, any code sections that were designated as duplicates in block 205 are output, and method 200 ends. In some embodiments, the determined duplicate code sections may be trimmed based on a last instruction end boundary in the determined duplicate code sections before the duplicate code sections are displayed to the user, such that each determined duplicate code section includes only full instructions.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

In an example embodiment of execution of method 100 of FIG. 1 and method 200 of FIG. 2, two source code fragments, as illustrated by Table 1 and Table 2, are received as input files. The source code input is segmented according to instruction boundaries in block 101 of method 100, as indicated in Table 1 and Table 2 by the and characters. Duplicates may include sequences of whole statements, e.g., starting with MOVE, DIVIDE and ADD, and ending with a '.' or at the end of a statement. Comments, denoted by "*" characters, may not be included in the statements identified by the segmentation of block 101 of method 100.

TABLE 1 example source code from file 1

*---------------------- STORING CURSOR POSITION*
{{MOVE EIBCPOSN TO WS-CURSOR-POS}
{DIVIDE 80 INTO WS-CURSOR-POS
   GIVING WS-CURSOR-LIN
   REMAINDER WS-CURSOR-COL}.}
{ADD +1 TO WS-CURSOR-LIN}.}

TABLE 2 example source code from file 2

*---------------------- STORING ADVANCED CURSOR POSITION *
{{MOVE EIBCPOSN TO WS-CURSOR-POS}
{DIVIDE 80 INTO WS-CURSOR-POS
   GIVING WS-CURSOR-LIN
   REMAINDER WS-CURSOR-COL}.}
{ADD +2 TO WS-CURSOR-LIN}.}

In the example corresponding to Table 1 and Table 2, the indices of 6 suffixes corresponding to the 6 locations where at least one opening brace is located are ordered lexicographically to construct an eGSA in block 102 of method 100, which is illustrated in Table 3. LCP and preceding statement information is determined in blocks 103 and 104 of method 100. The preceding statement information illustrated in Table 3 corresponds to the full string that stands between the index of the current suffix in the file and the preceding statement block in the same file (i.e. back to the preceding '{' in the segmented source code); however, in embodiments of block 104, a hash of the string is stored in the eGSA, rather than the full string.

TABLE 3 example eGSA corresponding to Table 1 and Table 2

| File | Suffix index | LCP | Preceding statement information | | |
|---|---|---|---|---|---|
| 1 | Index of {ADD +1 . . . | 0 | DIVIDE 80 | INTO | WS-CURSOR-POS |
| | | | | GIVING | WS-CURSOR-LIN |
| | | | | REMAINDER | WS-CURSOR-COL. |
| 2 | Index of {ADD +2 . . . | 4 | DIVIDE 80 | INTO | WS-CURSOR-POS |
| | | | | GIVING | WS-CURSOR-LIN |
| | | | | REMAINDER | WS-CURSOR-COL. |
| 1 | Index of {DIVIDE 80 . . . | 0 | MOVE EIBCPOSN | TO WS-CURSOR-POS | |
| 2 | Index of {DIVIDE 80 . . . | 71 | MOVE EIBCPOSN | TO WS-CURSOR-POS | |
| 1 | Index of {MOVE EIB . . . | 0 | — | | |
| 2 | Index of {MOVE EIB . . . | 97 | — | | |

A maximal duplicate code section may be identified by traversing the eGSA array line by line in ascending order, according to method 200 of FIG. 2, in block 105 of FIG. 1. For each row in which the LCP is above a threshold, a candidate duplicate code section is noted, according to block 202 of method 200 of FIG. 2. In the example of Table 3, row 4 may be flagged as being a clone of row 3 (based on the LCP of 71), and row 6 as being a clone of row 5 (based on the LCP of 97). The preceding statement information of line 4 and line 3 may be compared according to block 204, and, as the preceding statement information of lines 3 and 4 are identical, it may be determined that row 4 and row 3 are not the start of a maximal duplicate code section. The preceding statement information of row 6 and row 5 are also compared in block 204, and are determined not to match. Therefore, the suffix indices corresponding to row 6 and row 5 (starting with MOVE) are determined to be the start of maximal duplicate code sections, each having a length of 97 characters. The duplicate code sections corresponding to rows 5 and 6 may be displayed to the user in block 207 of method 200.

Figure 3:
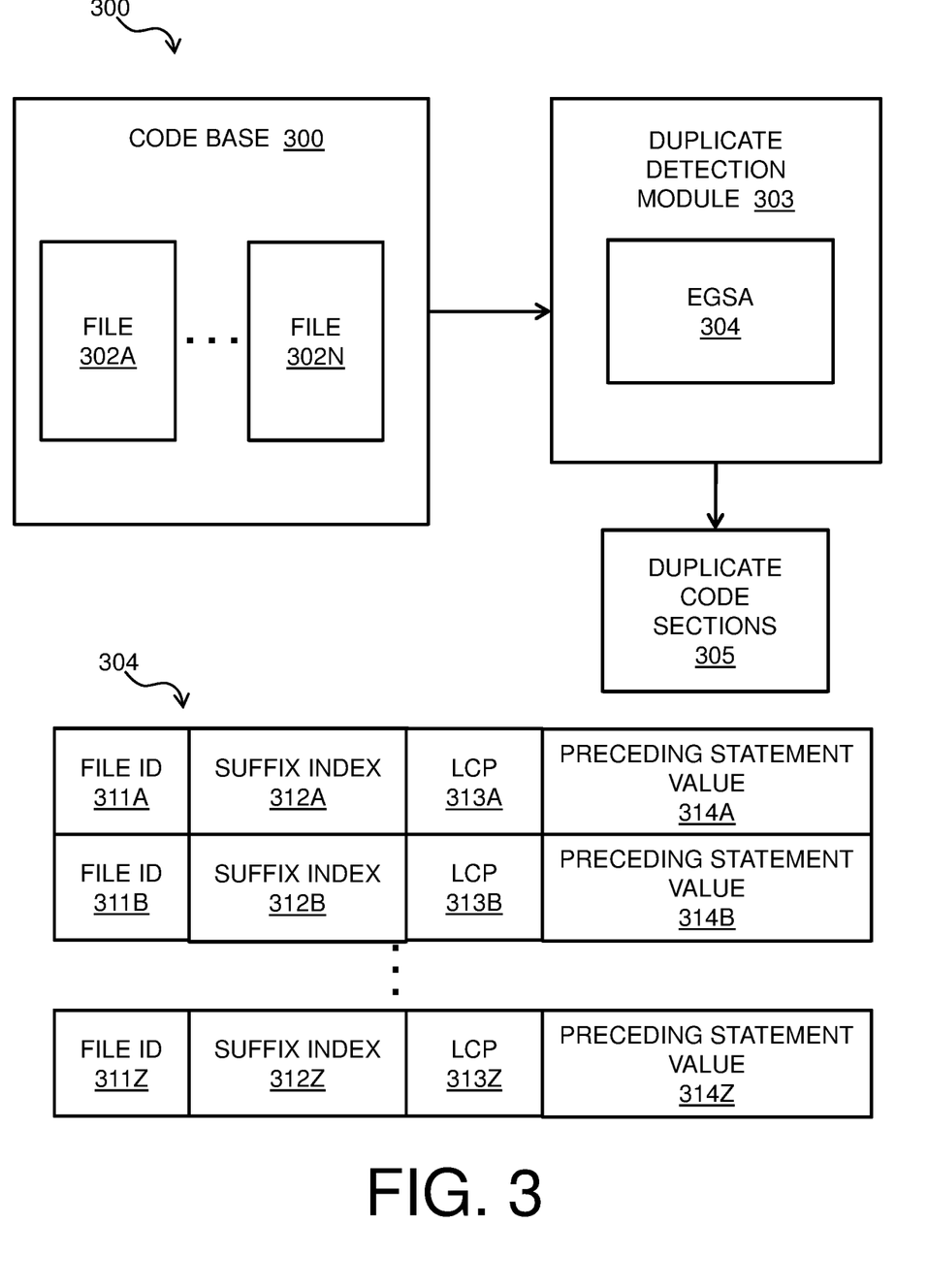
FIG. 3 is a block diagram of components of a system for duplicate code section detection for source code in accordance with one or more embodiments of the present invention.

Turning now to FIG. 3, system 300 that includes duplicate code section detection for source code is generally shown in accordance with one or more embodiments of the present invention. System 300 may be implemented in conjunction with any appropriate computer system, such as computer system 400 of FIG. 4. System 300 includes a code base 301 comprises a plurality of files 302A-N. The code base 301 may comprise source code in any appropriate computer programming language(s), and may be divided up into any appropriate number of files 302A-N, each file having any appropriate size. The duplicate detection module 303 may receive files 302A-N as input, and processes the files 302A-N according to method 100 of FIG. 1 and method 200 of FIG. 2. The eGSA 304 may be constructed according to blocks 101-104 of method 100 based on files 302A-N, and maximal duplicate code sections 305 from files 302A-N may be identified and displayed to the user based on eGSA 304 in block 105 of method 100 according to method 200 of FIG. 2.

The eGSA 304 includes a plurality of rows, in which the suffix index 312A-Z of each row corresponds to a single statement from files 302A-N. The statements may comprise full instructions, and may be determined based on instruction boundaries corresponding to the computer programming language(s) of code base 301. The suffix indices 312A-Z in the rows of eGSA 304 are ordered (for example, in ascending or descending order) based on the lexicographic order of corresponding suffixes in the input files 302A-N, according to block 102 of method 100. Each row includes a respective file identifier 311A-Z, LCP field 313A-Z, and preceding statement value 314A-Z corresponding to the row's suffix index 312A-Z. The LCP fields 313A-Z may be populated according to block 103 of method 100. For example, LCP field 313B may be determined by comparing the suffixes corresponding to suffix index 312B and suffix index 312A in their respective files, as indicated by file identifiers 311B and 311A. The preceding statement values 314A-Z may be populated according to block 104 of method 100. Preceding statement values 314A-Z includes a hash or fingerprint of a string corresponding to the preceding statement of the row's suffix index 312A-Z in the corresponding input file of files 302A-N. Duplicate code sections may be identified based on comparing adjacent pairs of preceding statement values 314A-Z. For example, it may be determined that suffix index 312B and suffix index 312A are the starting points of two maximal duplicate code sections based on LCP field 313B being above a threshold, and preceding statement value 314B and preceding statement value 314A not matching. LCP field 313B may give a size of the determined duplicate code sections corresponding to suffix index 312A and suffix index 312B.

It is to be understood that the block diagram of FIG. 3 is not intended to indicate that the system 300 is to include all of the components shown in FIG. 2. Rather, the system 300 can include any appropriate fewer or additional components not illustrated in FIG. 3 (e.g., additional memory components, embedded controllers, functional blocks, connections between functional blocks, modules, inputs, outputs, etc.).

Further, the embodiments described herein with respect to system 300 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 4:
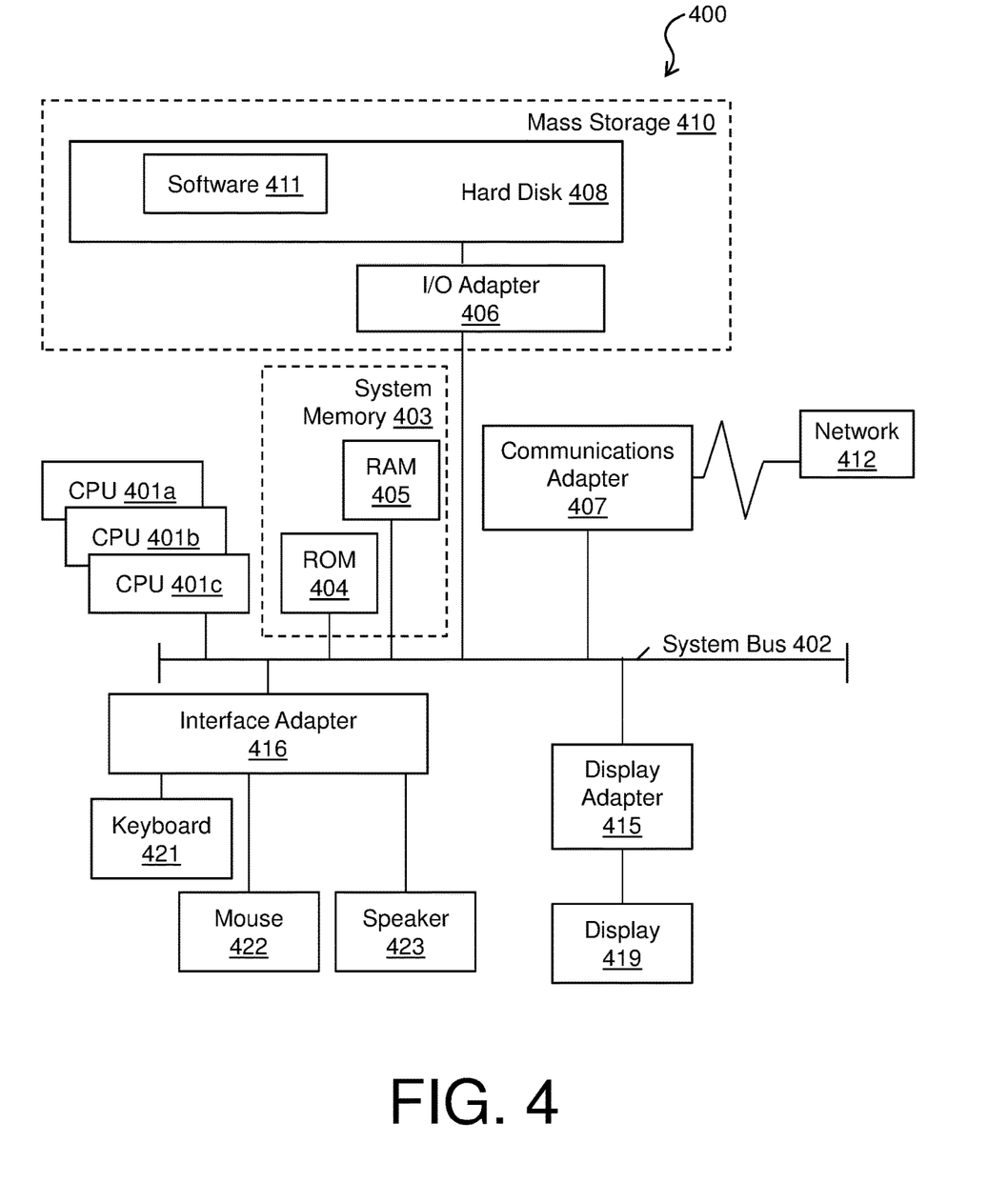
FIG. 4 is a block diagram of an example computer system for use in conjunction with one or more embodiments of duplicate code section detection for source code.

Turning now to FIG. 4, a computer system 400 is generally shown in accordance with an embodiment. The computer system 400 can be an electronic, computer framework comprising and/or employing any number and combination of computing devices and networks utilizing various communication technologies, as described herein. The computer system 400 can be easily scalable, extensible, and modular, with the ability to change to different services or reconfigure some features independently of others. The computer system 400 may be, for example, a server, desktop computer, laptop computer, tablet computer, or smartphone. In some examples, computer system 400 may be a cloud computing node. Computer system 400 may be described in the general context of computer system executable instructions, such as program modules, being executed by a computer system. Generally, program modules may include routines, programs, objects, components, logic, data structures, and so on that perform particular tasks or implement particular abstract data types. Computer system 400 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, the computer system 400 has one or more central processing units (CPU(s)) 401a, 401b, 401c, etc. (collectively or generically referred to as processor(s) 401). The processors 401 can be a single-core processor, multi-core processor, computing cluster, or any number of other configurations. The processors 401, also referred to as processing circuits, are coupled via a system bus 402 to a system memory 403 and various other components. The system memory 403 can include a read only memory (ROM) 404 and a random access memory (RAM) 405. The ROM 404 is coupled to the system bus 402 and may include a basic input/output system (BIOS), which controls certain basic functions of the computer system 400. The RAM is read-write memory coupled to the system bus 402 for use by the processors 401. The system memory 403 provides temporary memory space for operations of said instructions during operation. The system memory 403 can include random access memory (RAM), read only memory, flash memory, or any other suitable memory systems.

The computer system 400 comprises an input/output (I/O) adapter 406 and a communications adapter 407 coupled to the system bus 402. The I/O adapter 406 may be a small computer system interface (SCSI) adapter that communicates with a hard disk 408 and/or any other similar component. The I/O adapter 406 and the hard disk 408 are collectively referred to herein as a mass storage 410.

Software 411 for execution on the computer system 400 may be stored in the mass storage 410. The mass storage 410 is an example of a tangible storage medium readable by the processors 401, where the software 411 is stored as instructions for execution by the processors 401 to cause the computer system 400 to operate, such as is described herein below with respect to the various Figures. Examples of computer program product and the execution of such instruction is discussed herein in more detail. The communications adapter 407 interconnects the system bus 402 with a network 412, which may be an outside network, enabling the computer system 400 to communicate with other such systems. In one embodiment, a portion of the system memory 403 and the mass storage 410 collectively store an operating system, which may be any appropriate operating system, such as the z/OS or AI4 operating system from IBM Corporation, to coordinate the functions of the various components shown in FIG. 4.

Additional input/output devices are shown as connected to the system bus 402 via a display adapter 415 and an interface adapter 416 and. In one embodiment, the adapters 406, 407, 415, and 416 may be connected to one or more I/O buses that are connected to the system bus 402 via an intermediate bus bridge (not shown). A display 419 (e.g., a screen or a display monitor) is connected to the system bus 402 by a display adapter 415, which may include a graphics controller to improve the performance of graphics intensive applications and a video controller. A keyboard 421, a mouse 422, a speaker 423, etc. can be interconnected to the system bus 402 via the interface adapter 416, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 4, the computer system 400 includes processing capability in the form of the processors 401, and, storage capability including the system memory 403 and the mass storage 410, input means such as the keyboard 421 and the mouse 422, and output capability including the speaker 423 and the display 419.

In some embodiments, the communications adapter 407 can transmit data using any suitable interface or protocol, such as the internet small computer system interface, among others. The network 412 may be a cellular network, a radio network, a wide area network (WAN), a local area network (LAN), or the Internet, among others. An external computing device may connect to the computer system 400 through the network 412. In some examples, an external computing device may be an external webserver or a cloud computing node.

It is to be understood that the block diagram of FIG. 4 is not intended to indicate that the computer system 400 is to include all of the components shown in FIG. 4. Rather, the computer system 400 can include any appropriate fewer or additional components not illustrated in FIG. 4 (e.g., additional memory components, embedded controllers, modules, additional network interfaces, etc.). Further, the embodiments described herein with respect to computer system 400 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/ connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, by a processor, a plurality of input files corresponding to a software project, the plurality of input files comprising source code written in a computer programming language;
segmenting each of the plurality of input files into a plurality of statements based on instruction boundaries corresponding to the computer programming language, wherein a respective statement start index is determined for each of the plurality of statements;
populating an enhanced generalized suffix array (eGSA) based on the determined statement start indices, wherein each statement start index corresponds to a respective suffix in a row in the eGSA, and wherein each row comprises a longest common prefix (LCP) field and a preceding statement value corresponding to the row's respective suffix; and
identifying duplicate code sections in the plurality of input files based on the eGSA.

2. The method of claim 1, wherein each statement of the plurality of statements corresponds to a single instruction; wherein the suffixes are ordered lexicographically in the eGSA; and
wherein each row further comprises a file identifier corresponding to an input file of the plurality of input files in which the row's respective suffix is located.

3. The method of claim 1, wherein the preceding statement value of a row is determined based on a directly preceding statement to the row's respective suffix in an input file of the plurality of input files in which the row's respective suffix is located, wherein the directly preceding statement is determined based on the instruction boundaries.

4. The method of claim 3, wherein the preceding statement value of the row comprises a hash of the directly preceding statement.

5. The method of claim 1, wherein identifying duplicate code sections in the plurality of input files based on the eGSA comprises:
comparing an LCP field of a row of the eGSA to a threshold;
based on determining that the LCP field is greater than the threshold, comparing a preceding statement value of the row to a preceding statement value of a directly preceding row in the eGSA; and
based on determining that the preceding statement value of the row does not match the preceding statement value of the directly preceding row, determining that the row and the directly preceding row are duplicate code sections.

6. The method of claim 1, further comprising:
trimming the identified duplicate code sections based on instruction end boundaries;
displaying the identified duplicate code sections to a user; and
maintaining the software project based on the identified duplicate code sections.

7. The method of claim 1, wherein segmenting each of the plurality of input files into statements further comprises tokenizing a first string in the plurality of input files, the tokenizing comprising replacing a plurality of instances of the first string with a second string that is shorter than the first string.

8. A system comprising:
a memory having computer readable instructions; and
one or more processors for executing the computer readable instructions, the computer readable instructions controlling the one or more processors to perform operations comprising:
receiving a plurality of input files corresponding to a software project, the plurality of input files comprising source code written in a computer programming language;
segmenting each of the plurality of input files into a plurality of statements based on instruction boundaries corresponding to the computer programming language, wherein a respective statement start index is determined for each of the plurality of statements;
populating an enhanced generalized suffix array (eGSA) based on the determined statement start indices, wherein each statement start index corresponds to a respective suffix in a row in the eGSA, and wherein each row comprises a longest common prefix (LCP) field and a preceding statement value corresponding to the row's respective suffix; and
identifying duplicate code sections in the plurality of input files based on the eGSA.

9. The system of claim 8, wherein each statement of the plurality of statements corresponds to a single instruction; wherein the suffixes are ordered lexicographically in the eGSA; and
wherein each row further comprises a file identifier corresponding to an input file of the plurality of input files in which the row's respective suffix is located.

10. The system of claim 8, wherein the preceding statement value of a row is determined based on a directly preceding statement to the row's respective suffix in an input file of the plurality of input files in which the row's respective suffix is located, wherein the directly preceding statement is determined based on the instruction boundaries.

11. The system of claim 10, wherein the preceding statement value of the row comprises a hash of the directly preceding statement.

12. The system of claim 8, wherein identifying duplicate code sections in the plurality of input files based on the eGSA comprises:
   comparing an LCP field of a row of the eGSA to a threshold;
   based on determining that the LCP field is greater than the threshold, comparing a preceding statement value of the row to a preceding statement value of a directly preceding row in the eGSA; and
   based on determining that the preceding statement value of the row does not match the preceding statement value of the directly preceding row, determining that the row and the directly preceding row are duplicate code sections.

13. The system of claim 8, further comprising:
   trimming the identified duplicate code sections based on instruction end boundaries;
   displaying the identified duplicate code sections to a user; and
   maintaining the software project based on the identified duplicate code sections.

14. The system of claim 8, wherein segmenting each of the plurality of input files into statements further comprises tokenizing a first string in the plurality of input files, the tokenizing comprising replacing a plurality of instances of the first string with a second string that is shorter than the first string.

15. A computer program product comprising a computer readable storage medium having program instructions embodied therewith, the program instructions executable by one or more processors to cause the one or more processors to perform operations comprising:
   receiving a plurality of input files corresponding to a software project, the plurality of input files comprising source code written in a computer programming language;
   segmenting each of the plurality of input files into a plurality of statements based on instruction boundaries corresponding to the computer programming language, wherein a respective statement start index is determined for each of the plurality of statements;
   populating an enhanced generalized suffix array (eGSA) based on the determined statement start indices, wherein each statement start index corresponds to a respective suffix in a row in the eGSA, and wherein each row comprises a longest common prefix (LCP) field and a preceding statement value corresponding to the row's respective suffix; and
   identifying duplicate code sections in the plurality of input files based on the eGSA.

16. The computer program product of claim 15, wherein each statement of the plurality of statements corresponds to a single instruction;
   wherein the suffixes are ordered lexicographically in the eGSA; and
   wherein each row further comprises a file identifier corresponding to an input file of the plurality of input files in which the row's respective suffix is located.

17. The computer program product of claim 15, wherein the preceding statement value of a row is determined based on a directly preceding statement to the row's respective suffix in an input file of the plurality of input files in which the row's respective suffix is located, wherein the directly preceding statement is determined based on the instruction boundaries.

18. The computer program product of claim 17, wherein the preceding statement value of the row comprises a hash of the directly preceding statement.

19. The computer program product of claim 15, wherein identifying duplicate code sections in the plurality of input files based on the eGSA comprises:
   comparing an LCP field of a row of the eGSA to a threshold;
   based on determining that the LCP field is greater than the threshold, comparing a preceding statement value of the row to a preceding statement value of a directly preceding row in the eGSA; and
   based on determining that the preceding statement value of the row does not match the preceding statement value of the directly preceding row, determining that the row and the directly preceding row are duplicate code sections.

20. The computer program product of claim 15, further comprising:
   trimming the identified duplicate code sections based on instruction end boundaries;
   displaying the identified duplicate code sections to a user; and
   maintaining the software project based on the identified duplicate code sections.

* * * * *